(12) United States Patent
Hishiyama et al.

(10) Patent No.: US 10,692,257 B2
(45) Date of Patent: Jun. 23, 2020

(54) PROCESS MANAGEMENT APPARATUS, PROCESS MANAGEMENT METHOD, AND STORAGE MEDIUM

(71) Applicant: NEC Corporation, Minato-ku, Tokyo (JP)

(72) Inventors: Shuji Hishiyama, Tokyo (JP); Miho Yamada, Tokyo (JP); Daizaburou Shiramizu, Tokyo (JP); Akira Chida, Tokyo (JP); Kazuto Ohishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/344,853

(22) PCT Filed: Oct. 26, 2017

(86) PCT No.: PCT/JP2017/038674
§ 371 (c)(1),
(2) Date: Apr. 25, 2019

(87) PCT Pub. No.: WO2018/079647
PCT Pub. Date: May 3, 2018

(65) Prior Publication Data
US 2020/0051294 A1    Feb. 13, 2020

(30) Foreign Application Priority Data

Oct. 28, 2016    (JP) .................. 2016-211550

(51) Int. Cl.
*G06T 11/20* (2006.01)
*G06F 3/14* (2006.01)
*G06Q 10/06* (2012.01)

(52) U.S. Cl.
CPC .............. *G06T 11/206* (2013.01); *G06F 3/14* (2013.01); *G06Q 10/0631* (2013.01)

(58) Field of Classification Search
CPC .................... G06T 11/206; G06F 3/14
See application file for complete search history.

(56) References Cited

U.S. PATENT DOCUMENTS

| 7,688,322 B2* | 3/2010 | Kapler | .......... G06Q 10/06 345/440 |
| 2008/0278493 A1* | 11/2008 | Zion | .......... G01D 18/00 345/440 |

(Continued)

FOREIGN PATENT DOCUMENTS

| JP | 2010-040007 A | 2/2010 |
| JP | 2010-093227 A | 4/2010 |

(Continued)

OTHER PUBLICATIONS

Jo, Jaemin, Jaeseok Huh, Jonghun Park, Bohyoung Kim, and Jinwook Seo. "LiveGantt: Interactively visualizing a large manufacturing schedule." IEEE transactions on visualization and computer graphics 20, No. 12 (2014): pp. 2329-2338.*

(Continued)

*Primary Examiner* — Sarah Lhymn

(57) ABSTRACT

Provided is a process management apparatus, a process management method, and a storage medium that can display retention of articles based on a value of the articles handled in the process in addition to a time period of the process. A process management apparatus according to one example embodiment of the present invention includes: an acquisition unit that acquires information indicating a time period in which a process to handle articles is performed and a value of the articles; a generation unit that generates information used for displaying bands indicating at least two process regions surrounded by two first sides opposed to each other and two second sides connecting endpoints of the two first sides and a retention region connecting the first sides of the two process regions to each other that are (Continued)

temporally adjacent; and a display control unit that performs control to display the bands based on the information used for displaying the bands. The first sides have a length corresponding to the value of articles, and the second sides have a length corresponding to the time period in which a process is performed.

11 Claims, 10 Drawing Sheets

(56) References Cited

U.S. PATENT DOCUMENTS

| | | | |
|---|---|---|---|
| 2010/0068009 | A1 | 3/2010 | Kimura et al. |
| 2017/0075340 | A1* | 3/2017 | Claeys .................... G06F 17/50 |
| 2017/0091968 | A1* | 3/2017 | George ................. G06T 11/206 |
| 2017/0124531 | A1* | 5/2017 | McCormack .......... G06Q 10/06 |
| 2017/0126843 | A1* | 5/2017 | Pantea .................. G06F 3/1454 |
| 2017/0193131 | A1* | 7/2017 | Seo ....................... G06T 11/206 |
| 2017/0212668 | A1* | 7/2017 | Shah ................... G06F 3/04847 |
| 2017/0336930 | A1* | 11/2017 | Tappan ................. G06F 3/0482 |
| 2018/0081345 | A1* | 3/2018 | Mailman .......... G05B 19/41865 |

FOREIGN PATENT DOCUMENTS

| | | |
|---|---|---|
| JP | 2015-005085 A | 1/2015 |
| JP | 2015-049710 A | 3/2015 |

OTHER PUBLICATIONS

International Search Report for PCT Application No. PCT/JP2017/038674, dated Nov. 21, 2017.

* cited by examiner

FIG. 8

| ITEM | PROCESS | VALUE | RETENTION COST UNIT | RETENTION COST TOTAL | ROOM-FOR-IMPROVEMENT COST |
|---|---|---|---|---|---|
| + ITEM X | 1 | 100 | 100(20%) | 6600(37%) | 1350 (SECOND) |
| + ITEM M | 1 | 150 | 300(50%) | 5250(47%) | 1200 (THIRD) |
| ITEM n | 1 | 100 | 500(71%) | 4050(44%) | 500 (FOURTH) |
| + ITEM m | 1 | 100 | 0(0%) | 3550(43%) | 0 (SEVENTH) |
| ITEM β | 1 | 150 | 150(33%) | 3550(47%) | 150 (FIFTH) |
| ITEM α | 1 | 100 | 0(0%) | 3400(48%) | 0 (SEVENTH) |
| + ITEM K | 3 | 100 | 0(0%) | 3400(49%) | 0 (SEVENTH) |
|  | 2 | 350 | 2100(75%) | 3400(68%) | 3300 (FIRST) |
|  | 1 | 100 | 0(0%) | 100(17%) | 0 (SEVENTH) |
| ITEM k | 1 | 100 | 100(50%) | 100(50%) | 100 (SIXTH) |

PROCESS MANAGEMENT APPARATUS, PROCESS MANAGEMENT METHOD, AND STORAGE MEDIUM

This application is a National Stage Entry of PCT/JP2017/038674 filed on Oct. 26, 2017, which claims priority from Japanese Patent Application 2016-211550 filed on Oct. 28, 2016, the contents of all of which are incorporated herein by reference, in their entirety.

TECHNICAL FIELD

The present invention relates to an apparatus, a method, and a storage medium that perform process management such as manufacturing, storage, and transportation of a product or the like.

BACKGROUND ART

In general, manufacturing, storage, and transportation of a product includes one or a plurality of processes, and plans and achievements of respective processes are managed by a manager. To manage these processes, a scheme of visually expressing plans and achievements of respective processes by using a table such as a Gantt chart is used. Patent Literature 1 discloses a method of expressing schedules planned for respective processes by using a bar graph and expressing progress statuses by using an overlapped line graph. With such a method, since schedules of plans and achievements of respective processes are visually expressed, the manager is able to more easily recognize the status of respective processes than when only numerical values are used.

CITATION LIST

Patent Literature

PTL 1: Japanese Patent Application Laid-Open No. 2015-49710

SUMMARY OF INVENTION

Technical Problem

Articles handled in a certain process are put into the next process when the process is completed. At this time, when there is non-operating time between a schedule of a certain process and a schedule of the next process, a state where no article is used, that is, retention of the product occurs. When retention of articles occurs, the operation rate of the manufacturing line decreases or unnecessary cost for storage may occur in some cases. Therefore, in process management, processes are analyzed and improved so as to reduce retention of articles. To improve the efficiency of process management, a technology for suitably displaying retention of articles is required.

In general, a greater quantity or value including the price results in a greater waste due to retention of articles. However, since the method disclosed in Patent Literature 1 is to display a schedule of a process as a graph, although retention of articles can be displayed by using only the schedule of processes, information of the value of the articles is unable to be reflected to expression of the retention of the articles.

The present invention has been made in view of the problem described above and intends to provide a process management apparatus, a process management method, and a storage medium that can suitably display retention of articles based on the value of articles handled in a process in addition to the time of the process.

Solution to Problem

A first example aspect of the present invention is a process management apparatus including: an acquisition unit that acquires information indicating a time period in which a process to handle articles is performed and a value of the articles; a generation unit that generates information used for displaying bands indicating at least two process regions surrounded by two first sides opposed to each other and two second sides connecting endpoints of the two first sides and a retention region connecting the first sides of the two process regions to each other that are temporally adjacent; and a display control unit that performs control to display the bands based on the information used for displaying the bands, the first sides have a length corresponding to the value, and the second sides have a length corresponding to the time period.

A second example aspect of the present invention is a process management method including steps of: acquiring information indicating a time period in which a process to handle articles is performed and a value of the articles; generating information used for displaying bands indicating at least two process regions surrounded by two first sides opposed to each other and two second sides connecting endpoints of the two first sides and a retention region connecting the first sides of the two process regions to each other that are temporally adjacent; and performing control to display the bands based on the information used for displaying the bands, the first sides have a length corresponding to the value, and the second sides have a length corresponding to the time period.

A third example aspect of the present invention is a storage medium storing a program that causes a computer to perform steps of: acquiring information indicating a time period in which a process to handle articles is performed and a value of the articles; generating information used for displaying bands indicating at least two process regions surrounded by two first sides opposed to each other and two second sides connecting endpoints of the two first sides and a retention region connecting the first sides of the two process regions to each other that are temporally adjacent; and performing control to display the bands based on the information used for displaying the bands, the first sides have a length corresponding to the value, and the second sides have a length corresponding to the time period.

Advantageous Effects of Invention

According to the present invention, retention of articles can be suitably displayed based on the time period of a process and the value of the articles by using the process region surrounded by first sides having a length corresponding to the value and second sides having a length corresponding to the time period and the retention region connecting the two process regions to each other.

BRIEF DESCRIPTION OF DRAWINGS

FIG. 8 is a front view of a display displaying numerical value information according to the second example embodiment.

DESCRIPTION OF EMBODIMENTS

While example embodiments of the present invention will be described below with reference to the drawings, the present invention is not limited to these example embodiments. Note that, throughout the drawings described below, components having the same function are labeled with the same references, and the repeated description thereof may be omitted.

First Example Embodiment

Figure 1:
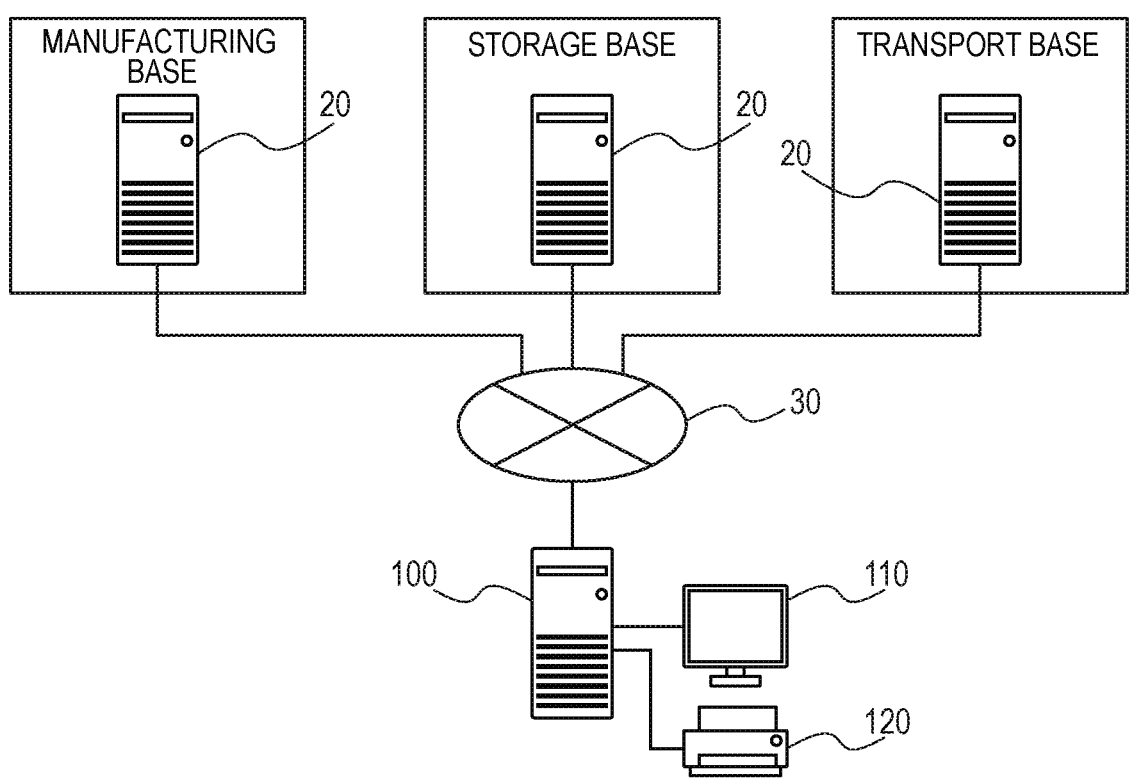
FIG. 1 is a schematic diagram of a process management system according to a first example embodiment.

FIG. 1 is a schematic diagram of a process management system 10 according to the present example embodiment. The process management system 10 has a process management apparatus 100 that performs management and display of processes and base management apparatuses 20 provided to respective bases. The bases may be, for example, a manufacturing base for manufacturing articles, a storage base for storing articles, and a transport base for transporting articles. The configuration of bases illustrated in FIG. 1 is an example, and the configuration of bases is not limited thereto. Any configuration is possible as long as there is at least one base to which the base management apparatus 20 is provided. There may be a plurality of manufacturing bases, there may be a plurality of storage bases, and there may be a plurality of transport bases, or there may be two or more types of bases as a single base.

The process management apparatus 100 and the base management apparatuses 20 are connected by wired connection or wireless connection via a network 30 such as the Internet. The process management system 10 may include other devices such as a server, a terminal, or the like.

Each of the base management apparatuses 20 is an apparatus that is installed in each base and collects process information including the start time and the end time of a process performed at the base, and the canceling start time and the end time when canceling of a process occurs, or an order number, a quantity, a price, or the like of articles handled in the process. One or a plurality of base management apparatuses 20 are provided in one base. The base management apparatus 20 transmits the collected process information to the process management apparatus 100.

The process management apparatus 100 receives and records process information from the base management apparatuses 20. Further, the process management apparatus 100 generates retention display information based on process information through a retention display operation described later and outputs the retention display information by using a display 110 or a printer 120 connected to the process management apparatus 100.

Figure 2:
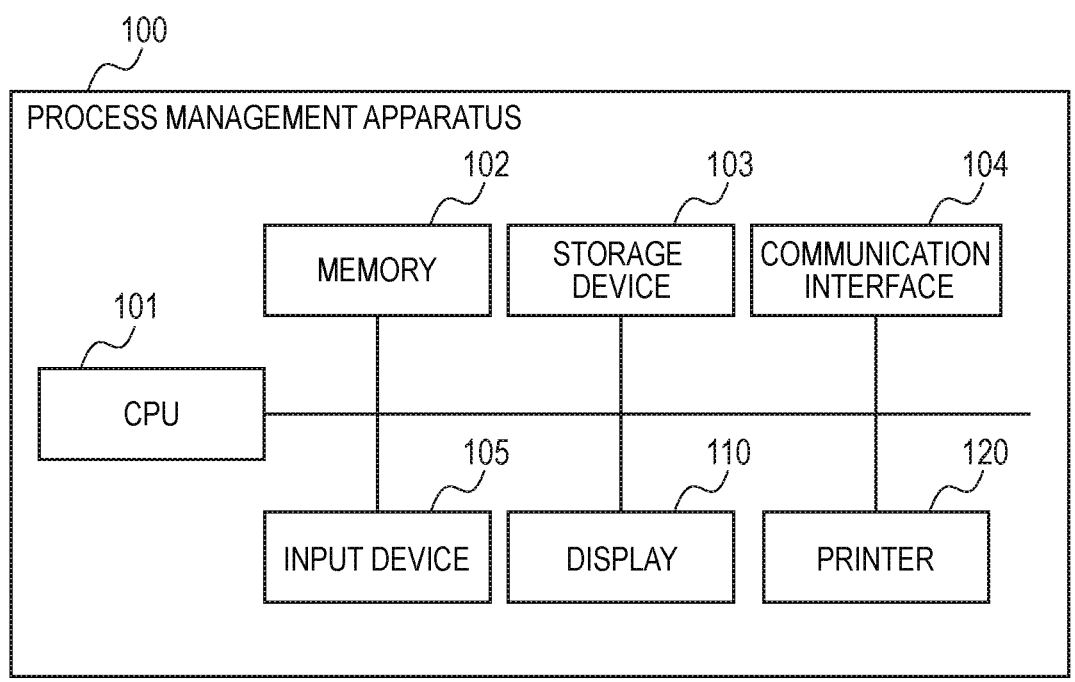
FIG. 2 is a general configuration diagram of a process management apparatus according to the first example embodiment.

FIG. 2 is a general configuration diagram of the process management apparatus 100 according to the present example embodiment. The process management apparatus 100 has a central processing unit (CPU) 101, a memory 102, a storage device 103, a communication interface 104, and an input device 105 in addition to the display 110 and the printer 120 described above. The process management apparatus 100 is not limited to the configuration illustrated in FIG. 2 but may further have other components. The process management apparatus 100 may include one or a plurality of devices or may be configured integrally with other devices. The base management apparatus 20 may have the same configuration as the process management apparatus 100.

The communication interface 104 is a communication unit that transmits and receives data and is configured to be able to implement a communication scheme of at least one of wired communication and wireless communication. The communication interface 104 includes a processor, an electric circuit, an antenna, a connector terminal, or the like necessary for the communication scheme. The communication interface 104 is connected to the network 30 and performs communication by using the communication scheme in accordance with a signal from the CPU 101.

The storage device 103 stores a program executed by the process management apparatus 100, resulted data processed by the program, or the like. The storage device 103 includes a read-only memory (ROM), a readable and writable hard disk drive or flash memory, or the like. Further, the storage device 103 may include a computer readable portable storage medium such as a CD-ROM. The memory 102 includes a random access memory (RAM) or the like that temporarily stores data being processed by the CPU 101 or data read from the storage device 103.

The CPU 101 is a processor that temporarily stores transitory data used for processing in the memory 102, reads a program stored in the storage device 103, and performs various processing operations such as calculation, control, determination, or the like on the transitory data in accordance with the program. Further, the CPU 101 stores data of a processing result in the storage device 103 and externally transmits data of a processing result via the communication interface 104.

The input device 105 includes a keyboard or the like used for an instruction to perform a retention display operation, accepts input from a user, and transmits input contents to the CPU 101 as a signal.

The display 110 is a display device that displays information to the user. Any display device such as a cathode ray tube (CRT) display, a liquid crystal display, or the like may be used as the display 110. The display 110 displays predetermined information such as retention display information in accordance with a signal from the CPU 101.

The printer 120 is a printer device that prints predetermined information such as retention display information or the like in accordance with a signal from the CPU 101. Any printer device such as a thermal printer, an ink jet printer, a laser printer, or the like may be used as the printer 120.

Figure 3A:
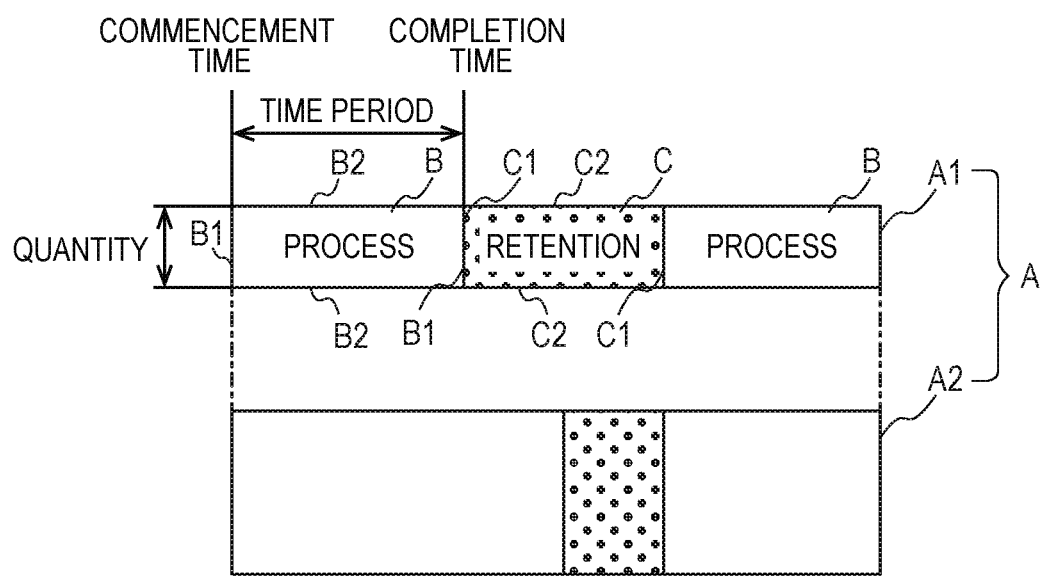
FIG. 3A is a schematic diagram of a process indication band displayed by the process management apparatus according to the first example embodiment.

FIG. 3A is a schematic diagram of a process indication band A displayed by the process management apparatus 100 according to the present example embodiment. In the present example embodiment, the expression of display/indication means visual indication to the user, such as displaying by using the display 110, printing by using the printer 120, or the like. The process indication band A includes at least two process regions B that display the start to the end of a process and a retention region C displayed between the process regions B which are temporally adjacent. The process indication band A is displayed for each order of articles. One process indication band A includes at least some of the processes of manufacturing, storing, and transporting a material, an intermediate product, and a final product (hereinafter, collectively referred to as "articles") used before the final shipment of articles targeted in one order.

The process region B is displayed for each process of handling articles. The process region B is a region which is surrounded by two first sides B1 opposed to each other and two second sides B2 connecting endpoints of the two first sides B1. The first side B1 has a length corresponding to the quantity of articles handled in a process. That is, the length of the first side B1 is set to be longer for a greater quantity and set to be shorter for a smaller quantity. For example, the length of the first side B1 may be set to be proportional to the quantity, or may be set to change stepwise in accordance with the quantity. The rule of the length of the first side B1 in accordance with the quantity is not limited to that illustrated here but may be determined in any manner and recorded in the process management apparatus 100 in advance.

To set the length of the first side B1, a price (that is, a product of a unit price and a quantity of articles) may be used instead of the quantity of articles. A use of a price of articles allows for easier comparison of the process indication bands A related to orders of articles whose unit prices are different. An index that can display a value of articles handled in a process, such as a quantity and a price of articles is here collectively referred to as a value of articles. In other words, a value of articles is calculated based on at least one of the quantity and the price, and the first side B1 has a length corresponding to the value of articles. The length of the first side B1 is set to be longer for a higher value and set to be shorter for a lower value.

One first side B1 of the two first sides B1 opposed to each other is arranged at a position indicating the commencement time (start time) of the process, and the other first side B1 is arranged at a position indicating the completion time of the process (end time). In other words, the two second sides B2 connecting the two first sides B1 have a length corresponding to the time period during which the process is performed (that is, the elapsed time from the start time to the end time). In addition, when one or more times of suspension of a process occurs from the suspension start time to the suspension end time in the middle of the process, the first side B1 may be arranged at the suspension start time and the suspension end time. At this time, the two first sides B1 may be arranged at the commencement time and the suspension start time of a process, may be arranged at the suspension end time of the previous suspension and the suspension start time of the next suspension when two or more times of suspension occur, or may be arranged at the suspension end time and the completion time of a process.

The length of the second side B2 is set to be longer for a longer time period and set to be shorter for a shorter time period. For example, the length of the second side B2 may be set to be proportional to time or may be set to change stepwise in accordance with time. The rule of the length of the second side B2 in accordance with time is not limited to that illustrated here but may be determined in any manner and recorded in the process management apparatus 100 in advance.

The retention region C is displayed between the first process region B and the second process region B that are temporally adjacent to each other. Specifically, the retention region C is generated by connecting the first side B1 on the second process region B side included in the first process region B to the first side B1 on the first process region B side included in the second process region B. The retention region C is a region surrounded by two first sides C1 opposed to each other and two second sides C2 connecting the two first sides C1. The first side C1 has the same length as the first side B1 of the process region B. The first side C1 of the retention region C may match the first side B1 of the process region B or may be separated by a predetermined length. When the first process region B and the second process region B are in contact with each other or are closer to each other than a predetermined reference (for example, 10% of the combined length of the second sides B2 of the first and second process regions B), the retention region C may not be generated.

Each of the two second sides C2 connecting the two first sides C1 has a length corresponding to a time period (referred to as retention time) between the first process region B and the second process region B. The length of the second side C2 is set to be longer for a longer time period and set to be shorter for a shorter time period. For example, the length of the second side C2 may be set to be proportional to a time period or may be set so as to change stepwise in accordance with a time period. The rule of the length of the second side C2 in accordance with a time period is not limited to that illustrated here but may be determined in any manner and recorded in the process management apparatus 100 in advance.

The appearance such as the color, the pattern, or the like of the retention region C is displayed so as to be different from the appearance of the process region B. This enables the user to easily recognize the retention region C. Further, a text such as "process" or "retention" for distinguishing the process region B from the retention region C may be provided inside or near the process region B and the retention region C.

Information used for displaying the process indication band A including the process region B and the retention region C is temporarily recorded in the memory 102 after being generated by the CPU 101 and is displayed by using the display 110 or the printer 120.

According to such a display method, the retention region C is displayed larger when at least one of the quantity (value) of articles and the retention time between processes is larger. The area of the retention region C is an index based on both the time period and the value of retention of articles, and it can be said that the larger the area is, the more the waste occurs. Specifically, by changing the process so as to shift backward the first process region B or shift forward the second process region B, it is possible to reduce the retention region C. Therefore, the user is able to visually understand the retention region C having large room for improvement and easily analyze the importance of each retention region C.

FIG. 3A illustrates exemplary process indication band A1 and process indication band A2. The quantity in the process indication band A2 is higher than the quantity in the process indication band A1. On the other hand, retention time of the process indication band A1 in the process region B is longer than that of the process indication band A2. Since the areas of the retention regions C are substantially the same in the process indication bands A1 and A2, the importance of these retention regions C is substantially equal. In contrast, with the expression with a bar graph using only the schedule as disclosed in Patent Literature 1, there is likelihood of being simply determined that the process indication band A1 having the longer retention time period is more important. Therefore, in the process management apparatus 100 according to the present example embodiment, since the retention of articles is visually expressed based on the quantity (value) of articles in addition to the retention time of the articles, it is possible to more appropriately determine a process in which retention of higher importance occurs.

Figure 3B:
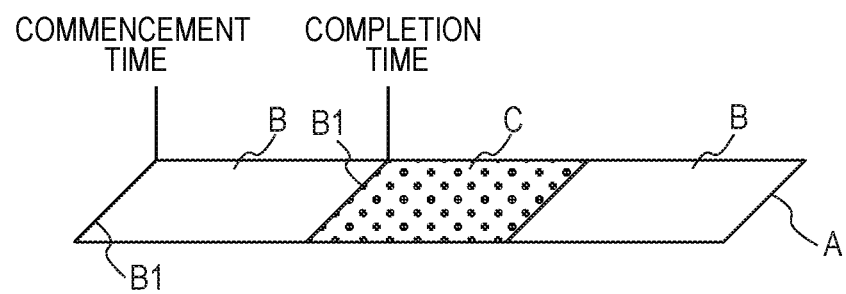
FIG. 3B is a schematic diagram of a process indication band displayed by the process management apparatus according to the first example embodiment.
Figure 3C:
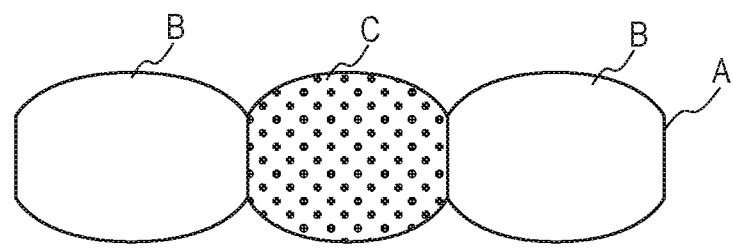
FIG. 3C is a schematic diagram of a process indication band displayed by the process management apparatus according to the first example embodiment.

FIG. 3B and FIG. 3C illustrate a modified example of the process indication band A. In the process indication band A of FIG. 3B, the sides of the process region B and the retention region C intersect each other at an angle which is not orthogonal. Specifically, the process region B and the retention region C in FIG. 3B are not rectangular as illustrated in FIG. 3A but are parallelogramic. Therefore, one first side B1 of the two first sides B1 opposed to each other is a line segment extending from a position indicating the process commencement time (start time) at an angle not parallel to the extension line of the commencement time. The other first side B1 is a line segment extending from a position indicating a process completion time (end time) at an angle not parallel to an extension line of the completion time. Further, the two first sides B1 may extend at angles different from each other. Further, one of the first sides B1 may extend from a position indicating the process commencement time at an angle parallel to the extension line of the commencement time, and the other first side B1 may extend from the position indicating the completion time of the process at an angle not parallel to the extension line to the completion time. Conversely, one of the first sides B1 may extend from a position indicating the process commencement time at an angle not parallel to the extension line of the commencement time, and the other first side B1 may extend from the position indicating the completion time of the process at an angle parallel to the extension line of the completion time.

In the process indication band A of FIG. 3C, at least a part of the sides of the process region B and the retention region C is formed of a curved line. Also in FIGS. 3B and 3C, as with FIG. 3A, the retention region C is displayed larger when at least one of the value of articles and the retention time between processes is larger. As illustrated in FIG. 3A to 3C, the process indication band A may be expressed in various manners as long as the size of the retention region C can be changed based on the retention time and the value of articles.

Figure 4:
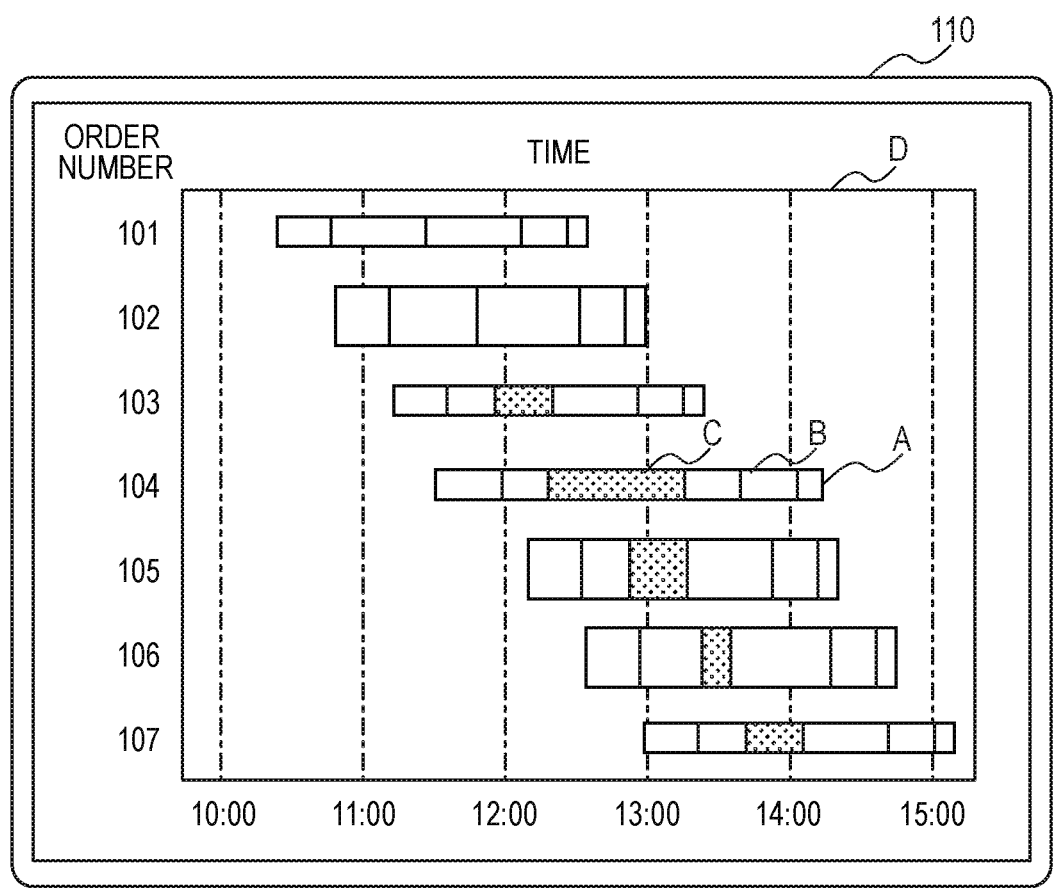
FIG. 4 is a front view of a display displaying retention display information according to the first example embodiment.

FIG. 4 is a front view of the display 110 displaying retention display information D according to the present example embodiment. The retention display information D includes at least one process indication band A and more preferably includes two or more process indication bands A for comparative analysis. The vertical axis of the retention display information D represents the order number used for identifying the order, and the horizontal axis represents time. The process indication band A is displayed at the position of the corresponding order number and time on the retention display information D. The output of the retention display information D may be performed in any manner that can visually indicate the output to the user, such as printing by the printer 120, without being limited to screen display by using the display 110.

By arranging and displaying the process indication band A with respect to the order and time in such a way, it is possible to easily compare the process indication band A and the retention region C included therein and analyze what order and time the retention occurred for or the like. In the example of FIG. 4, it can be easily understood that the retention regions C of the order numbers 104 and 105 are particularly large.

Figure 5:
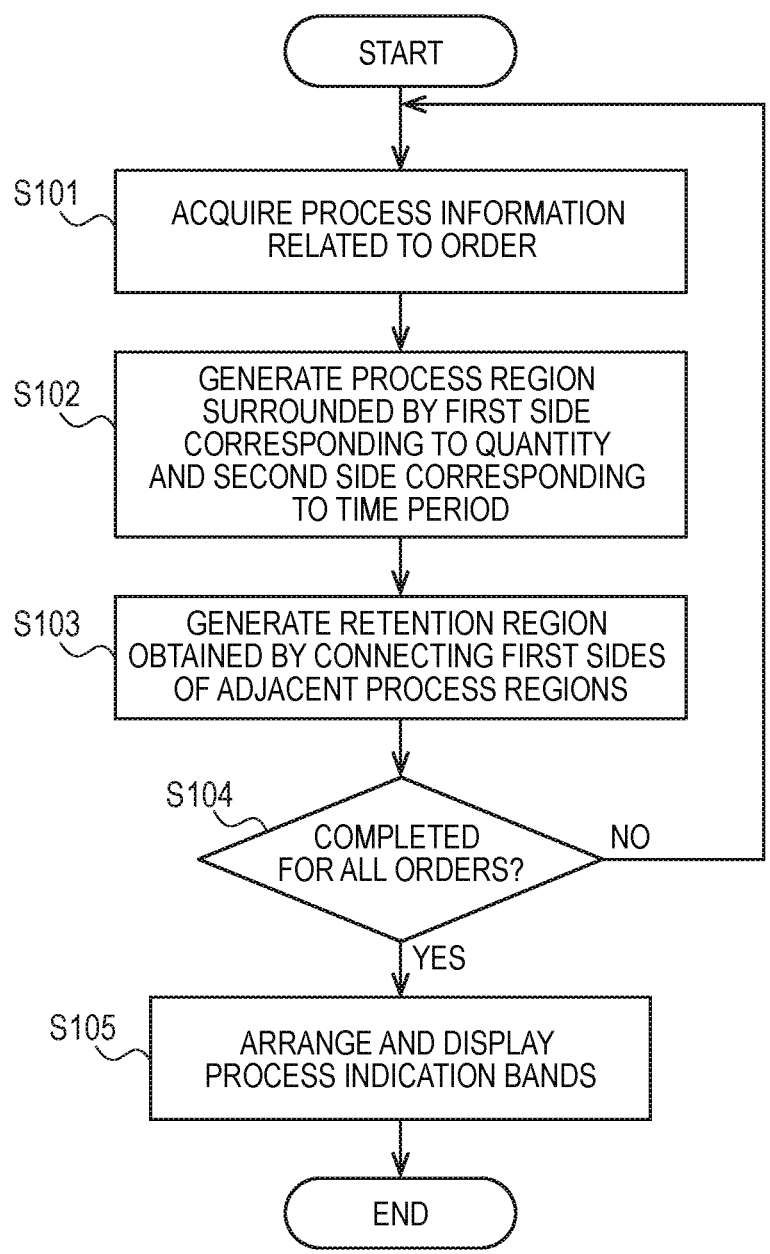
FIG. 5 is a diagram illustrating a flowchart of a retention display operation according to the first example embodiment.

FIG. 5 is a diagram illustrating a flowchart of a retention display operation performed in the process management method according to the present example embodiment. The retention display operation is performed by the process management apparatus 100. The retention display operation is started by the user performing a predetermined operation from the input device 105 of the process management apparatus 100, for example.

First, the process management apparatus 100 receives and acquires process information related to one order from the base management apparatus 20 (step S101). The process information may be received from the base management apparatus 20 every time the retention display operation is performed, or process information that is received from the base management apparatus 20 and stored in the process management apparatus 100 in advance may be read.

Next, for each process, the process management apparatus 100 generates, from the process information acquired in step S101, information used for displaying process region B surrounded by the two first sides opposed to each other having a length corresponding to the quantity of articles and two second sides opposed to each other having a length corresponding to a time period of the process (step S102).

Next, the process management apparatus 100 uses the process region B generated in step S102 and generates information used for displaying the retention region C by connecting the first sides of the two process regions B temporally adjacent to each other (step S103). Step S103 is performed for all the combinations of two process regions B temporally adjacent in the process region B generated in step S102. When two process regions B temporally adjacent are in contact with each other or are closer to each other than a predetermined reference (for example, 10% of the combined length of the second sides B2 of the two adjacent process regions B), the retention region C may not be generated.

The process management apparatus 100 temporarily stores, in the memory 102, information used for displaying the process indication band A including the process region B and the retention region C generated in steps S102 to S103.

If the generation of information used for displaying the process indication band A is not completed for all the orders (step S104, NO), steps S101 to S103 are repeated for the next order. All the orders as ending conditions are, for example, all the orders in a time period designated by users or all the orders included in the maximum displayable amount (for example, the size of the display region of the display 110 or the size of a sheet used by the printer 120 for printing). Moreover, all the orders as ending conditions may be, out of all the orders, particular orders designated by users or particular orders and the orders associated with the particular orders, for example.

If the generation of information used for displaying the process indication band A is completed for all the orders (step S104, YES), the process management apparatus 100 reads information used for displaying the process indication band A from the memory 102 and performs control for displaying the process indication band A including the process region B and the retention region C generated in steps S102 to S103 using the display 110, the printer 120, or the like (step S105). Specifically, as illustrated in FIG. 4, the process management apparatus 100 arranges and displays the process indication band A including the process region B and the retention region C with respect to the order and time. At this time, the process management apparatus 100 displays the appearance of the process region B and the retention region C so as to be different from each other.

In the present example embodiment, the CPU 101 of the process management apparatus 100 is a subject of each step (process) included in the operation illustrated in FIG. 5. Specifically, the CPU 101 functions as an acquisition unit that performs step S101, a generation unit that performs steps S102 to S103, and a display control unit that performs step S105. The CPU 101 reads a program used for executing the operation illustrated in FIG. 5 from the memory 102 or the storage device 103 and performs the operation illustrated in FIG. 5 by executing the program to control each unit of the process management apparatus 100. Further, at least a part of the operation illustrated in FIG. 5 may be performed by a dedicated device or an electric circuit rather than the CPU 101.

According to the process management apparatus 100 of the present example embodiment, retention of articles occurring between processes can be visually expressed based on a quantity (value) of the articles in addition to retention time of the articles. Such a configuration enables the user to visually recognize the importance of the retention and easily perform comparison between a plurality of orders.

Second Example Embodiment

While the first example embodiment displays retention for respective articles corresponding to one order, the present example embodiment displays processes related to lower level articles (a material, an intermediate product, and a final product) used before the completion (or shipment) of certain articles in a stacked manner and displays retention of accumulated costs. This enables the user to overlook retention that may occur before the completion of articles. In the present example embodiment, the process management apparatus 100 and the base management apparatuses 20 having the same configuration as those in the first example embodiment are used.

Figure 6:
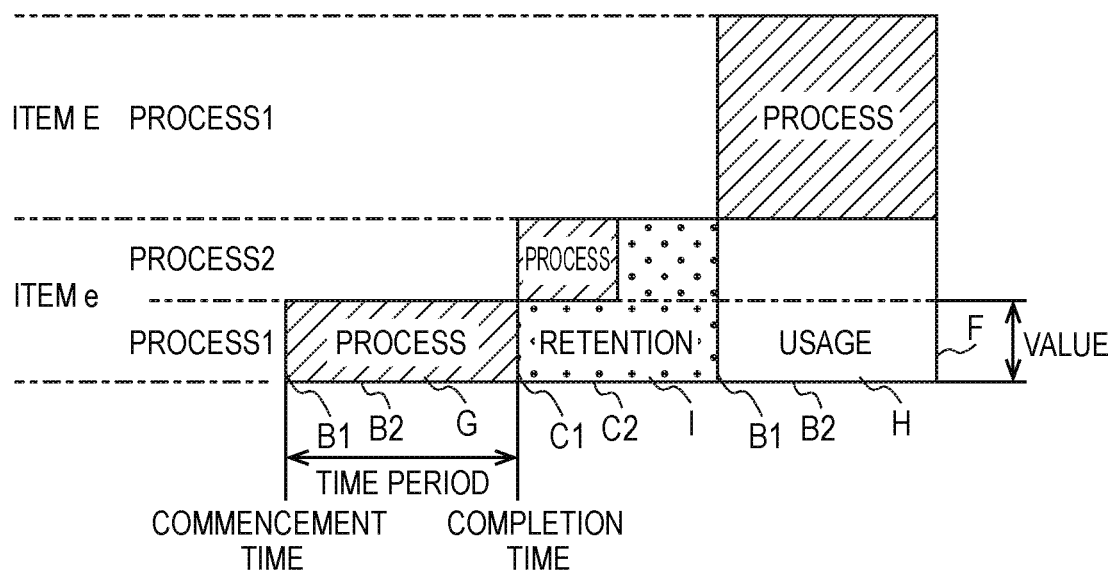
FIG. 6 is a schematic diagram of a process indication band displayed by a process management apparatus according to a second example embodiment.

FIG. 6 is a schematic diagram of a process indication band F displayed by the process management apparatus 100 according to the present example embodiment. In the present example embodiment, the expression of display/indication means visual indication to the user, such as displaying by using the display 110, printing by using the printer 120, or the like. The process indication band F is generated for each combination of articles (an item) and a process. The plurality of generated process indication bands F are displayed such that the process indication bands F are stacked from a lower level process to a higher level process for one type of articles and further stacked from lower level articles to higher level articles. Here, a process performed earlier is classified into a lower level and a process performed later is classified into a higher level for one type of articles. Further, articles manufactured earlier are classified into a lower level, and articles manufacture using lower level articles are classified into a higher level. That is, in a manufacture process, a material is classified into the lower level articles, and a manufactured product is classified into the higher level articles. The relationships between processes and between articles are defined in process information generated by the base management apparatus 20.

One or more processes are associated with one type of articles. In the example of FIG. 6, since a process 1 and a process 2 are sequentially performed in order to manufacture an item e, the process 1 is of the lower level process, and the process 2 is of the higher level process. It is here assumed that each process is a manufacturing process, the process may be a storage process or a transport process. Further, since the item e is used for manufacturing the item E, the item e corresponds to lower level articles, and the item E corresponds to higher level articles. Multiple types of lower level articles may be associated with one type of higher level articles.

One process indication band F includes a process region G that displays a process of handling articles from the start to the end, a usage region H used in a process in which the articles are related to higher level articles, and a retention region I displayed between the process region G and the usage region H. While related to the higher level articles rather than the articles of interest, the usage region H is substantially the same as the process region G in terms of displaying a value of articles and the time period of a process. The process region G and the usage region H are displayed in the same display method as the process region B of the first example embodiment, and the retention region I is displayed in the same display method as the retention region C of the first example embodiment. Therefore, the second side C2 of the retention region I represents a retention time period after lower level articles are completed (stocked in a case of procurement item) before higher level articles are input as a material (shipped in a case of a final product). The difference from the first example embodiment is that, while the first side B1 has a length corresponding to a value of each types of articles in the first example embodiment, the first side B1 has a length corresponding to an increment of a value for each process of articles in the present example embodiment.

The appearance such as the color, the pattern, or the like of the retention region I is displayed so as to be different from the appearance of the process region G and the usage region H. This enables the user to easily recognize a retention region. Further, a text such as "process", "usage", or "retention" for distinguish these regions may be provided inside or near the process region G, the usage region H, and the retention region I.

For example, an increment of a value of articles for each process is defined by cost caused by manufacturing the articles, such as cost of a material (excluding lower level articles) used in the process of interest, running cost of an apparatus, labor cost, and the like. Alternatively, an increment of the value may be defined not only by the cost caused for the manufacturing but also by a commercial value for articles. Upon the completion of a certain process, the increment of the value due to the process is added to the value of the articles. In the example of FIG. 6, the value of the item e is equal to the increment of the value of the process 1 at the completion and becomes the sum of the increment of the value of the process 2 and the increment of the value of the process 1 at the completion of the process 2. Furthermore, the value of the item E is the sum of the value of the item e and the increment of the value of the process 1 at the completion of the process 1.

The process indication band F of a higher level process is stacked on the process indication band F of a lower level process in this order, and thereon the process indication band F of higher level articles is stacked on the process indication band F of lower level articles in this order. The direction in which the process indication bands F are stacked is not limited to the upward direction but may be any direction as long as it is a direction from the lower level articles and process to the higher level articles and process. The boundary line between the stacked process indication bands F may be displayed or may be deleted.

In the example of FIG. 6, the process indication band F of the process 2 of the item e is stacked on the process indication band F of the process 1 of the item e, and the process indication band F of the process 1 of the item E is stacked thereon. Since there is time from the completion of the processes 1 and 2 of the item e to the commencement time of the process 1 of the item E, the retention region I is displayed therebetween. Portions where a plurality of retention regions I are contact with each other appear as if a single large retention region I exists. Thus, when overlooking the entirety, the user is able to easily understand processes where the retention regions I are gathered.

With such a display method, the retention region I is displayed larger when at least one of the value of articles (specifically, an increment of the value for each process) and a retention time period between processes is larger. The area of the retention region I is an index based on both the value of articles and a retention time period of the articles, and it can be said that the larger the area is, the more the waste occurs. For example, in FIG. 6, it is possible to reduce the retention region I by changing a process so as to shift backward a process related to the lower level item e or shift forward a process related to the higher level item E. This enables the user to visually understand an important retention region I and easily analyze the effect of reduction for each retention region I.

Figure 7:
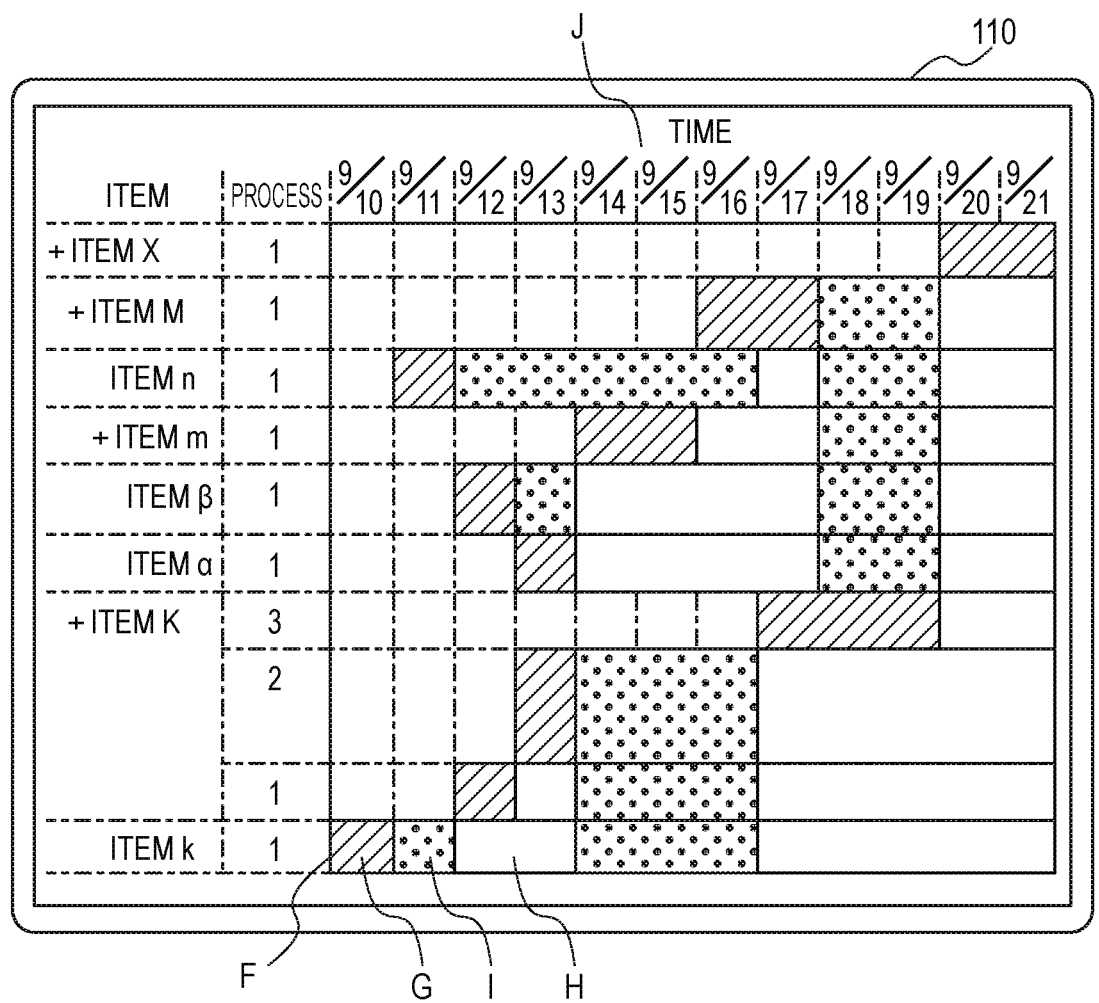
FIG. 7 is a front view of a display displaying retention display information according to the second example embodiment.

FIG. 7 is a front view of the display 110 that displays retention display information J according to the present example embodiment. The retention display information J includes at least one process indication band F, more preferably includes two or more process indication bands F for comparison and analysis. The vertical axis of the retention display information J represents the process for respective articles (each item), and the horizontal axis represents time. The process indication band F is displayed at a position of a process and time for respective corresponding articles on the retention display information J. The output of the retention display information J is not limited to the screen display by the display 110 but may be performed in any manner that can perform visual display to the user, such as printing by using the printer 120.

With such display in which the process indication bands F are stacked in a direction from the lower level articles and process to the higher level articles and process, the user is able to overlook the material to the final product and analyze which process has large room for improvement of retention or the like.

While the process indication band F is generated for each combination of articles and a process in the present example embodiment, the process indication band F may be generated for respective articles in the same manner as in the first example embodiment and stacked in one direction for display.

In the example of FIG. 7, it can be seen that the retention region I present before the process 1 of the item X is large. Thus, it can be determined that it is possible to effectively reduce retention by shifting forward the process 1 of the item X. Further, it can be seen that the retention region I present before the process 3 of the item K is large. Thus, it can be determined that it is possible to effectively reduce retention by shifting forward the process 3 of the item K.

As one example, the display form of the retention region I may be changed in accordance with the area of the retention region I. More specifically, for example, in such a display form, when the area of the retention region I exceeds a predetermined reference (threshold), the retention region I may be emphasized and displayed (emphasis display) compared to other retention regions. Note that, in the above description, the configuration in which the retention region I is emphasized and displayed when the area of the retention region I exceeds a predetermined reference has been described as an example. However, the example embodiment according to the present invention is not limited to such a configuration. Such emphasis display may be applied to the process region B (hereinafter the same applies to each example embodiment).

FIG. 8 is a front view of the display 110 displaying numerical value information P corresponding to retention display information J according to the present example embodiment. The numerical value information P expresses the content corresponding to the retention display information J as a numerical value.

The numerical value information P includes a value Q, a unit retention cost R, a total retention cost S, and a room-for-improvement cost T (every unit is thousand yen in FIG. 8). The value Q is an increment of the value for each process and corresponds to the length in the vertical axis direction of the process indication band F.

The unit retention cost R corresponds to the area of the retention region I in the process indication band F thereof (the product of an increment of the value and a retention time period). Further, a ratio of the unit retention cost R relative to the entire area in the process indication band F or interest is provided in a parenthesis to the unit retention cost R.

The total retention cost S corresponds to the sum of the areas of the retention regions I in the process indication band F of interest and the process indication band F of all the lower level articles and processes. Further, a ratio of the total retention cost S relative to all the areas in the process indication band F of interest and the process indication band F of the lower level articles and processes is provided in parenthesis to the total retention cost S.

The room-for-improvement cost T corresponds to the sum of the areas of the retention regions I in the process indication band F of interest and the process indication band F of the lower level articles and processes that can be solved by adjustment of the process of the process indication band F of interest. Further, the rank of the room-for-improvement cost T of the process indication band F of interest of all the process indication bands F is provided in parenthesis to the room-for-improvement cost T.

While only the numerical value information P is displayed for visibility in FIG. 8, the numerical value information P may be displayed to be switched to the retention display information J in accordance with a user operation for display or may be displayed at the same time as the retention display information J.

By displaying the numerical value information P corresponding to the retention display information J in such a way, it is possible to perform more accurate analysis by using the numerical value as illustrated in FIG. 8 than by using only the size of the retention region I as illustrated in FIG. 7.

Figure 9:
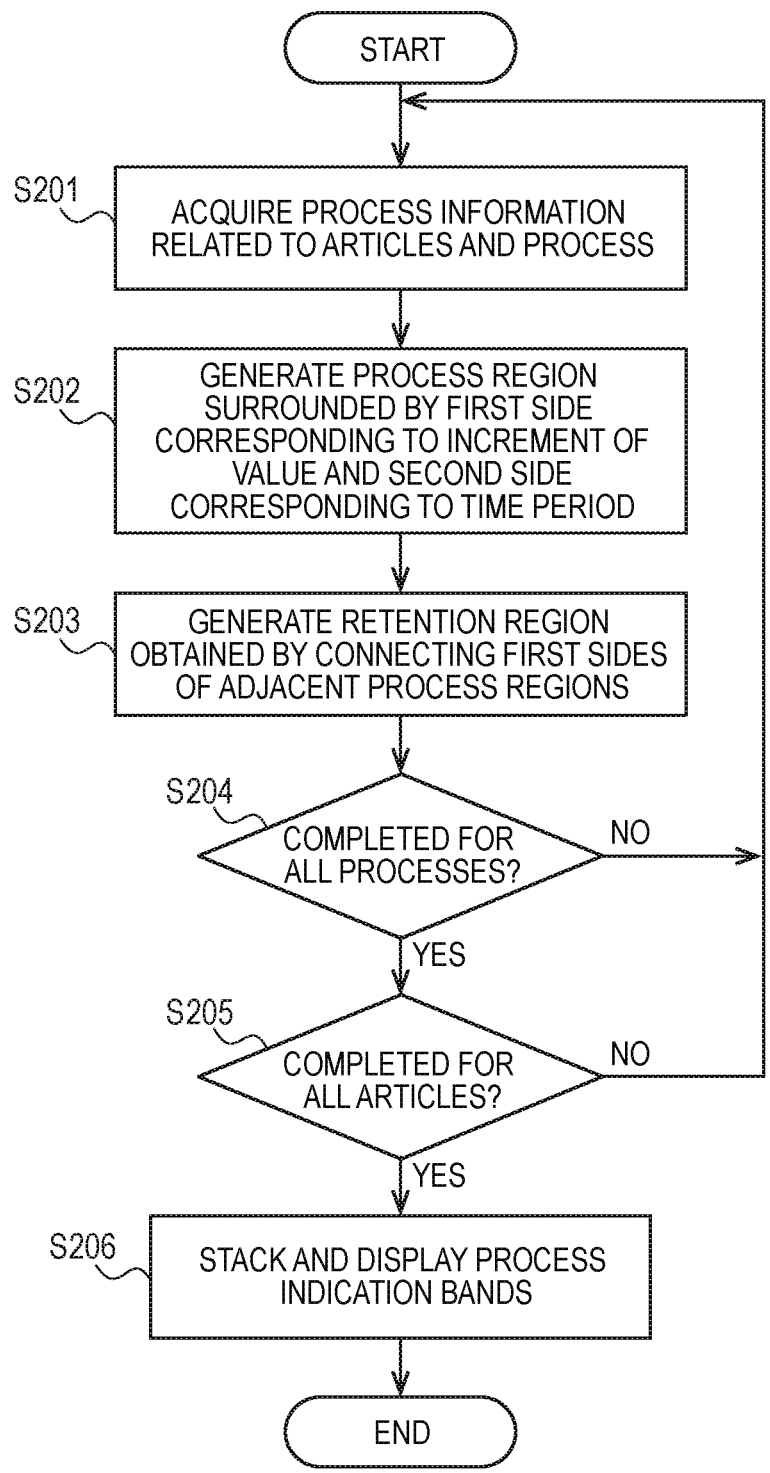
FIG. 9 is a diagram illustrating a flowchart of a retention display operation according to the second example embodiment.

FIG. 9 is a diagram illustrating a flowchart of the retention display operation performed in the process management method according to the present example embodiment. The retention display process is performed by the process management apparatus 100. The retention display process is started by the user performing a predetermined operation from the input device 105 of the process management apparatus 100, for example.

First, the process management apparatus 100 receives and acquires process information related to a combination of one type of articles and a process from the base management apparatus 20 (step S201). The process information may be received from the base management apparatus 20 every time the retention display operation is performed, or the process information received from the base management apparatus 20 and stored in the process management apparatus 100 in advance may be read.

Next, the process management apparatus 100 generates, from the process information acquired in step S201, information used for displaying the process region G surrounded by two first sides opposed to each other having a length corresponding to the increment of the value of articles for each process and two second sides opposed to each other having a length corresponding to the time period of the process (the same applies to the usage region H) (step S202). Since the usage region H indicates the same information as the process region G, the usage region H is handled below as the process region G.

Next, the process management apparatus 100 uses the process region G generated in step S202 and generates information used for displaying the retention region I by connecting the first sides of the two process regions G to each other which are temporally adjacent each other (step S203). Step S203 is performed for all the combinations of two process regions G which are temporally adjacent each other out of the process regions G generated in step S202. When two process regions G which are temporally adjacent each other are in contact with each other or closer to each other than a predetermined reference (for example, 10% of the combined length of the second sides B2 of adjacent two process regions G), the retention region I may not be generated.

The process management apparatus 100 temporarily stores information used for displaying the process indication band F including the process region G and the retention region I generated in steps S202 to S203 in the memory 102.

If the generation of information used for displaying the process indication bands F for all the processes of one type of articles is not finished (step S204, NO), steps S201 to S203 are repeated for the next process. If the generation of information used for displaying the process indication bands F for all the articles is not finished (step S205, NO), steps S201 to S203 are repeated for the next articles. All the articles and processes as the ending conditions are, for example, all the articles and processes within a time period designated by the user or all the articles and processes that can be included in the maximum amount that can be displayed (for example, the size of a display region of the display 110 or the size of a sheet used by the printer 120 for printing).

If the generation of information used for displaying the process indication bands F for all the articles and the processes is finished (step S204, YES, and step S205, YES), the process management apparatus 100 reads information used for displaying the process indication band F from the memory 102 and performs control for displaying the process indication bands F including the process region G (the usage region H) and the retention region I generated by steps S202 to S203 by using the display 110, the printer 120, or the like (step S206). Specifically, as illustrated in FIG. 7 as an example, the process management apparatus 100 stacks and displays the process indication bands F including the process region G and the retention region I in the direction from the lower level articles and process to the higher level articles and process. Further, as illustrated in FIG. 8 as an example, the process management apparatus 100 may display numerical value information corresponding to retention display information. At this time, the process management apparatus 100 displays the process region G and the retention region I so as to be different in appearance from each other.

In the present example embodiment, the CPU 101 of the process management apparatus 100 is a subject of each step (process) included in the operation illustrated in FIG. 9. Specifically, the CPU 101 functions as an acquisition unit that performs step S201, a generation unit that performs steps S202 to S203, and a display control unit that performs step S206. The CPU 101 reads a program used for executing the operation illustrated in FIG. 9 from the memory 102 or the storage device 103 and performs the operation illustrated in FIG. 9 by executing the program to control each unit of the process management apparatus 100. Further, at least a part of the operation illustrated in FIG. 9 may be performed by a dedicated device or an electric circuit rather than the CPU 101.

According to the process management apparatus 100 of the present example embodiment, retention of articles occurring between processes can be visually expressed based on the value of the articles for each process in addition to retention time of the articles. By stacking and displaying processes and retention in the direction from lower level articles and process to higher level articles and process in such a way, the user is able to overlook the entirety from a material to a final product and analyze which process has a large room-for-improvement of retention or the like.

Other Example Embodiments

Figure 10:
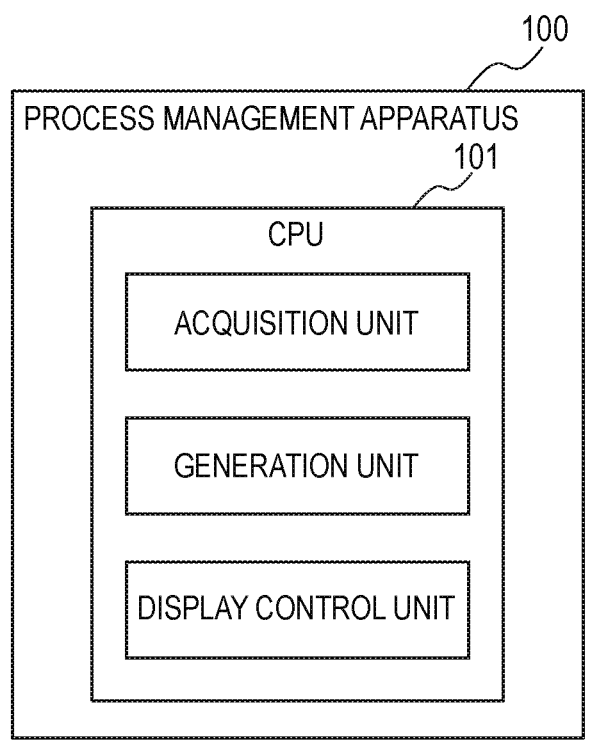
FIG. 10 is a general configuration view of the process management apparatus according to each example embodiment.

FIG. 10 is a schematic configuration diagram of the process management apparatus 100 according to each of the above described example embodiments. FIG. 10 illustrates an example of a configuration by which the process management apparatus 100 functions as an apparatus that displays retention of articles based on the value of the articles handled in a process in addition to the process time period. The process management apparatus 100 includes the CPU 101 that operates an acquisition unit that acquires information indicating a time period in which a process to handle articles and a value of the articles is performed; a generation unit that generates information used for displaying bands indicating at least two process regions surrounded by two first sides opposed to each other and two second sides connecting endpoints of the two first sides and a retention region connecting the first sides of the two process regions to each other that are temporally adjacent; and a display control unit that performs control to display the bands based on the information used for displaying the bands. The first sides have a length corresponding to the value of articles handled in a process, and the second sides have a length corresponding to the time period in which a process to handle the articles is performed.

The present invention is not limited to the example embodiments described above and may be changed as appropriate within a scope not departing from the spirit of the present invention.

A processing method that stores a program that operates the configuration of the example embodiment to implement the function of each example embodiment described above (for example, a program that causes the process management apparatus 100 to perform the operation illustrated in FIG. 5 and FIG. 9) in a storage medium, reads the program recorded in the storage medium as a code, and executes it in a computer is also included in the scope of each example embodiment. That is, a computer readable storage medium is also included in the scope of each example embodiment. Further, not only the storage medium in which the computer program described above is stored but also the computer program itself is included in each example embodiment.

As the storage medium, for example, a floppy (registered trademark) disk, a hard disk, an optical disk, a magneto-optical disk, a CD-ROM, a magnetic tape, a non-volatile memory card, or a ROM may be used. Further, without being limited to one executing the operation with only the program stored in the storage medium, those operating on an OS to execute the operation in corporation with other software or the function of an extension board is included in the scope of each example embodiment.

The whole or part of the example embodiments disclosed above can be described as, but not limited to, the following supplementary notes.

(Supplementary Note 1)

A process management apparatus comprising:

an acquisition unit that acquires information indicating a time period in which a process to handle articles is performed and a value of the articles;

a generation unit that generates information used for displaying bands indicating at least two process regions surrounded by two first sides opposed to each other and two second sides connecting endpoints of the two first sides and a retention region connecting the first sides of the two process regions to each other that are temporally adjacent; and a display control unit that performs control to display the bands based on the information used for displaying the bands, wherein the first sides have a length corresponding to the value, and wherein the second sides have a length corresponding to the time period.

(Supplementary Note 2)

The process management apparatus according to supplementary note 1, wherein the generation unit generates the bands for respective articles.

(Supplementary Note 3)

The process management apparatus according to supplementary note 1, wherein the generation unit generates the bands for each combination of the articles and the process.

(Supplementary Note 4)

The process management apparatus according to supplementary note 2, wherein the display control unit performs the control so as to arrange and display the bands in accordance with the articles and the time period based on the information used for displaying the bands.

(Supplementary Note 5)

The process management apparatus according to supplementary note 3, wherein the display control unit performs the control so as to stack and display the bands in accordance with the combination based on the information used for displaying the bands.

(Supplementary Note 6)

The process management apparatus according to supplementary note 5, wherein the process includes a lower level process to handle the articles earlier and a higher level process to handle the articles after the lower level process, and wherein the display control unit performs the control so as to stack the bands of the higher level process on the bands of the lower level process.

(Supplementary Note 7)

The process management apparatus according to supplementary note 5 or 6, wherein the articles include lower level articles manufactured earlier and higher level articles manufactured by using the lower level articles, and wherein the display control unit performs the control so as to stack the bands of the higher level articles on the bands of the lower level articles.

(Supplementary Note 8)

The process management apparatus according to any one of supplementary notes 1 to 7, wherein the time period indicates any one of elapsed time from start time of the process to end time of the process, elapsed time from start time of the process to suspension start time of the process, elapsed time from suspension end time of the process to suspension start time of the process, and elapse time from suspension end time of the process to end time of the process.

(Supplementary Note 9)

The process management apparatus according to any one of supplementary notes 1 to 8, wherein the value is calculated based on at least one of a quantity of the articles and a price of the articles.

(Supplementary Note 10)

A process management method comprising steps of:

acquiring information indicating a time period in which a process to handle articles is performed and a value of the articles;

generating information used for displaying bands indicating at least two process regions surrounded by two first sides opposed to each other and two second sides connecting endpoints of the two first sides and a retention region connecting the first sides of the two process regions to each other that are temporally adjacent; and performing control to display the bands based on the information used for displaying the bands, wherein the first sides have a length corresponding to the value, and wherein the second sides have a length corresponding to the time period.

(Supplementary Note 11)

A storage medium storing a program that causes a computer to perform steps of:

acquiring information indicating a time period in which a process to handle articles is performed and a value of the articles;

generating information used for displaying bands indicating at least two process regions surrounded by two first sides opposed to each other and two second sides connecting endpoints of the two first sides and a retention region connecting the first sides of the two process regions to each other that are temporally adjacent; and performing control to display the bands based on the information used for displaying the bands, wherein the first sides have a length corresponding to the value, and wherein the second sides have a length corresponding to the time period.

While the present invention has been described with reference to the example embodiments, the present invention is not limited to the example embodiments described above. Various changes that can be understood by those skilled in the art within the scope of the present invention can be made to the features or the details of the present invention.

This application is based upon and claims the benefit of priority from Japanese Patent Application No. 2016-211550, filed on Oct. 28, 2016, the disclosure of which is incorporated herein in its entirety by reference.

REFERENCE SIGNS LIST 10 process management system
20 base management apparatus
30 network
100 process management apparatus
101 CPU
102 memory
103 storage device
104 communication interface
105 input device
110 display
120 printer

What is claimed is:

1. A process management apparatus comprising:
an acquisition unit that acquires information indicating a time period in which a process to handle articles is performed and a value of the articles;
a generation unit that generates information used for displaying bands indicating at least two process regions surrounded by two first sides opposed to each other and two second sides connecting endpoints of the two first sides and a retention region connecting the first sides of the two process regions to each other that are temporally adjacent; and
a display control unit that performs control to display the bands based on the information used for displaying the bands,
wherein the first sides have a length corresponding to the value, and
wherein the second sides have a length corresponding to the time period.

2. The process management apparatus according to claim 1, wherein the generation unit generates the bands for respective articles.

3. The process management apparatus according to claim 2, wherein the display control unit performs the control so as to arrange and display the bands in accordance with the articles and the time period based on the information used for displaying the bands.

4. The process management apparatus according to claim 1, wherein the generation unit generates the bands for each combination of the articles and the process.

5. The process management apparatus according to claim 4, wherein the display control unit performs the control so as to stack and display the bands in accordance with the combination based on the information used for displaying the bands.

6. The process management apparatus according to claim 5,
wherein the process includes a lower level process to handle the articles earlier and a higher level process to handle the articles after the lower level process, and
wherein the display control unit performs the control so as to stack the bands of the higher level process on the bands of the lower level process.

7. The process management apparatus according to claim 5,
wherein the articles include lower level articles manufactured earlier and higher level articles manufactured by using the lower level articles, and
wherein the display control unit performs the control so as to stack the bands of the higher level articles on the bands of the lower level articles.

8. The process management apparatus according to claim 1, wherein the time period indicates any one of elapsed time from start time of the process to end time of the process, elapsed time from start time of the process to suspension start time of the process, elapsed time from suspension end time of the process to suspension start time of the process, and elapse time from suspension end time of the process to end time of the process.

9. The process management apparatus according to claim 1, wherein the value is calculated based on at least one of a quantity of the articles and a price of the articles.

10. A process management method comprising steps of:
acquiring information indicating a time period in which a process to handle articles is performed and a value of the articles;
generating information used for displaying bands indicating at least two process regions surrounded by two first sides opposed to each other and two second sides connecting endpoints of the two first sides and a retention region connecting the first sides of the two process regions to each other that are temporally adjacent; and
performing control to display the bands based on the information used for displaying the bands,
wherein the first sides have a length corresponding to the value, and
wherein the second sides have a length corresponding to the time period.

11. A non-transitory storage medium storing a program that causes a computer to perform steps of:
acquiring information indicating a time period in which a process to handle articles is performed and a value of the articles;
generating information used for displaying bands indicating at least two process regions surrounded by two first sides opposed to each other and two second sides connecting endpoints of the two first sides and a retention region connecting the first sides of the two process regions to each other that are temporally adjacent; and
performing control to display the bands based on the information used for displaying the bands,
wherein the first sides have a length corresponding to the value, and
wherein the second sides have a length corresponding to the time period.

* * * * *